March 17, 1970 H. WALDMAN 3,501,592

TELEPHONE ANSWERING APPARATUS WITH CUEING AND WARNING SIGNALS

Filed March 30, 1964 5 Sheets-Sheet 1

INVENTOR.
HERBERT WALDMAN
BY
James Olan Spady
ATTORNEY

TELEPHONE ANSWERING APPARATUS WITH CUEING AND WARNING SIGNALS

Filed March 30, 1964 5 Sheets-Sheet 2

INVENTOR.
HERBERT WALDMAN

BY

James Alan Spady
ATTORNEY

TELEPHONE ANSWERING APPARATUS WITH CUEING AND WARNING SIGNALS

Filed March 30, 1964 5 Sheets-Sheet 3

INVENTOR.
HERBERT WALDMAN
BY
James Alan Spady
ATTORNEY

March 17, 1970 H. WALDMAN 3,501,592

TELEPHONE ANSWERING APPARATUS WITH CUEING AND WARNING SIGNALS

Filed March 30, 1964 5 Sheets-Sheet 4

INVENTOR.
HERBERT WALDMAN
BY
James Dlan Spady
ATTORNEY

INVENTOR.
HERBERT WALDMAN
BY
James Alan Spady
ATTORNEY 3,501,592
Patented Mar. 17, 1970

3,501,592

TELEPHONE ANSWERING APPARATUS WITH CUEING AND WARNING SIGNALS

Herbert Waldman, Brooklyn, N.Y., assignor to Electrospace Corporation, Glen Cove, N.Y., a corporation of Delaware Continuation-in-part of application Ser. No. 766,746 Oct. 13, 1958. This application Mar. 30, 1964, Ser. No. 355,746
Int. Cl. H04m *11/10*
U.S. Cl. 179—6 4 Claims

ABSTRACT OF THE DISCLOSURE

In an apparatus for automatically answering a telephone call including a sound carrier tape having recorded thereon an outgoing announcement message and and a tone signal of a pre-selected frequency for the balance of said tape following the announcement message. The function of the tone signal is to serve in the capacity of cueing and warning tones to a calling party indicating to him the mode of operations the apparatus is about to perform, the mode of operation the apparatus is about to terminate or the failure of the apparatus to perform a mode of operation as required of it.

Figures 1, 2, 3:
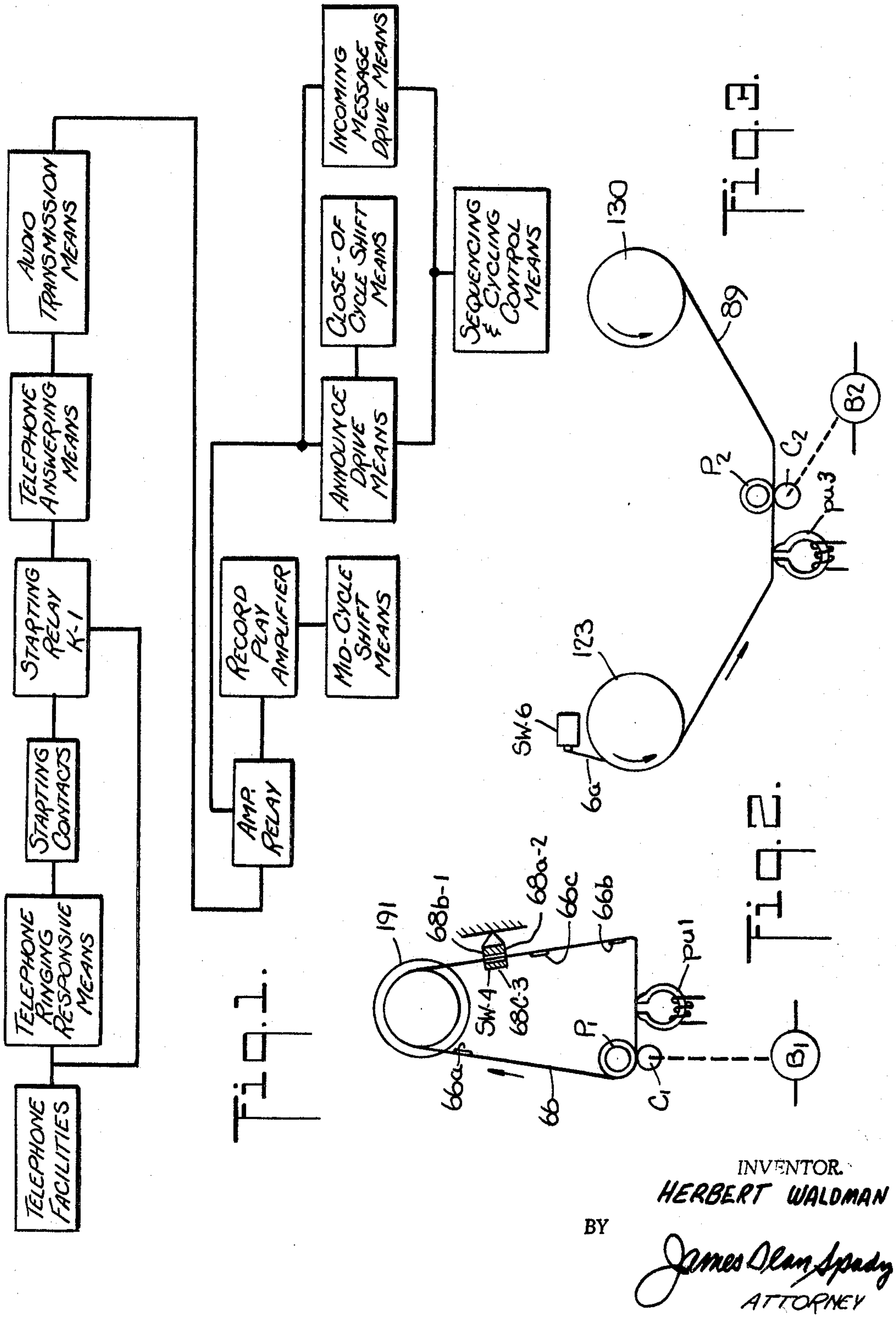

This application is a continuation in part of my copending application Ser. No. 766,746, filed Oct. 13, 1958, now Patent No. 3,127,474, issued on Mar. 31, 1964.

This invention relates to an apparatus for automatically answering a telephone call by transmitting a prerecorded announcement to a calling party and recording a message from the calling party. More particularly, this invention is directed to means adapted to control the sequence of operations and the interval of operation of such an apparatus.

There are known telephone-answering apparati of this kind in which the shifting from one phase of operation to the next phase and the re-cycling, back into standby position of the apparatus, is controlled by mechanical means, such as, for example, by the movement of a tone arm on a record disc, or by a motor-driven series of cams and cam followers.

The present invention provides an endless loop of a magnetic tape as the carrier for a pre-recorded announcement, and utilizes this endless loop as the sequencing and cycling control means, causing the apparatus to be switched through its respective phases and finally to be restored to its initial conditions. An advantage of the subject invention is that the announce tape acts as both the pre-recorded announcement carrier and the sequencing and cycling control media. Economy and reliability are resultant advantages afforded by this use of the announce tape as the sequencing cycling control media, in that the use of special equipment or means such as, for example, cams or timers is avoided.

The invention further provides facilities enabling the "user" himself to pre-record any announcement he desires, to be played-out to a calling party. The apparatus includes provisions for recording a tone signal of a preselected frequency immediately following the recording of the outgoing announcement and continuing to the end of the tape loop cycle. Both the announcement and tone signal are recorded onto the endless tape loop. The "user" may vary the length of his announcement to suit his particular needs. The said tone will always be recorded immediately following the announcement with no time delay being incurred between the end of the announcement and the beginning of the tone signal, the particular announcement length notwithstanding. The "user" may also change a recorded announcement as often as he requires, by simply recording a new announcement in its place. The function of the tone signal is to serve in the capacity of cueing and warning tones to a calling party indicating to him the mode of operations the apparatus is about to perform or is failing to perform.

An example of an announcement might be: "This is an automatic secretary answering. Kindly state your name, address and telephone number, and any message you wish to leave. Start talking at the end of the sound of the first tone signal. You have approximately thirty seconds in which to record your message. The sound of the second tone signal signifies that you have approximately six seconds left. The third tone signifies that your recording time is about to end." This example announcement will be referred to throughout this specification to illustrate the operation of the apparatus.

Accordingly, it is an object of this invention to provide an apparatus which will play-out a first tone (mid-cycle shift tone) when ready to record a message, a second tone (pre-close-out tone) serving notice to the caller that he has only so many seconds remaining in which to record his mesage, a third tone (close-out tone) signal indicating that the close of the recording period is about to occur.

While some of the prior art systems do provide a close-out tone indicating that the recording time is being terminated, such a tone is merely informative in nature, and does not serve a warning function by giving notice upon the calling party that he must conclude his message momentarily. In prior art systems, at the sound of the close-out tone, the calling party is cut off abruptly without due prior notice.

Accordingly, another object of this invention is to shift the apparatus into its record mode succeeding said close out one signal in order to provide a short interval of time for the calling party to record a few concluding words.

Another object of the present invention is to provide means by which the said close-out and pre-close out tones may consist of an automatic sequence of two or more short closely spaced tones.

A still further object of the present invention is to provide the play-out of a continuous warning tone to a calling party in the event the apparatus is not in condition to record an incoming message due to some malfunction. This tone will continue to be played-out for the entire remaining cycle interval.

An additional advantage afforded by the use of the announce tape for timing-out the cycle of operation is, that the "user" can readily control the time duration of the incoming message record period, by varying the time duration of his pre-recorded announcement. Since the total length of loop tape is fixed, the less time is used for the announcement, the more time is allowed for the calling party to leave his message, and vice versa.

Accordingly, still another object of the present invention is to enable the "user" to control the time duration to be allotted to the calling party for recording his message.

However, although it is advantageous to have such control by the user, there is one problem inherent as a result of the incoming message-record period being of a variable time duration rather than of a consistent fixed-time duration. Specifically, the problem is that after several messages are recorded, eventually a last call may be received by the answering apparatus without sufficient recording tape left to record a message of the full preanounced time duration.

In contradistinction, in the case of a "fixed message time" system, the total amount of recording tape provided constitutes a multiple of so many incoming message recording periods of even time duration. When the pre-determined number of message recording periods has expired, the electrical power supply to the apparatus is disabled, thus rendering the apparatus inoperative.

In the instant invention the problem is overcome by the use of a microswitch so placed in relation to the message tape, as to prevent the apparatus from intercepting any subsequent calls, but nonetheless, allowing the call in process to be completed. The actuation of the mirco-switch takes place when the supply of the message recording tape has reached a pre-set low level point.

Accordingly, it is still another object of the present invention to incorporate an answer limit switch serially in the telephone ring detector circuit so as to prevent the apparatus from accepting calls when there exists a supply deficiency of the message recording tape.

In another aspect, the invention concerns circuit configurations and switching arrangements adapted to provide a multitude of functions and features in a practical, simple-to-operate, compact telephone answering device.

A novel feature made possible by the unique circuitry and switching arrangements of the invention, is the muting of the speaker during the announcement "check" mode of the apparatus. This muting takes place in the "check" mode after a momentary play-out of the pre-recorded tone, at the conclusion of the play-out of the pre-recorded announcement. The purpose in causing the said muting, is to avoid the annoyance of hearing the continuous play-out, over the loud-speaker, of the pre-recorded tone, for the duration of the tape loop cycle.

Another novel feature resulting from the unique circuits and switching arrangement of the invention, is that the apparatus may be operatively associated with a telephone either by a direct conductive connection coupling method or by an indirect inductive coupling method or by an acoustic coupling method. These alternative coupling methods are all well-known by those skilled in the art. One inductive coupling mechanism that may be used with the present invention is fully described in the copending application, Ser. No. 355,401, filed Mar. 27, 1964, now abandoned, sharing a common assignee with the instant invention.

These and further objects, features and advantages of the invention will be pointed out hereinbelow, or will become apparent as the description of the embodiment of the invention proceeds.

An example of a specific embodiment according to the invention, is schematically represented in the accompanying drawings. It will be understood that no limitation of the invention is thereby intended and that various changes and alterations are contemplated such as would ordinarily occur to one skilled in the art to which the invention relates.

Figure 4A:
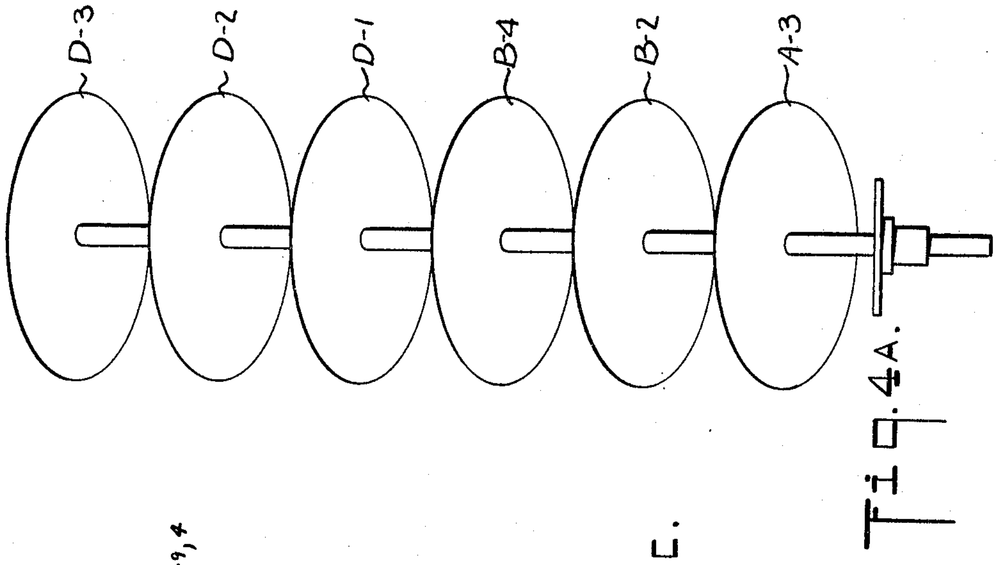
Figure 4B:
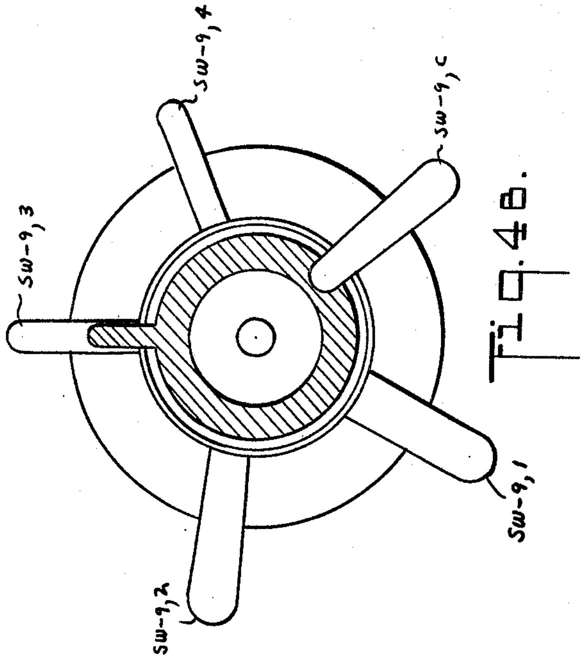
Figure 4C:
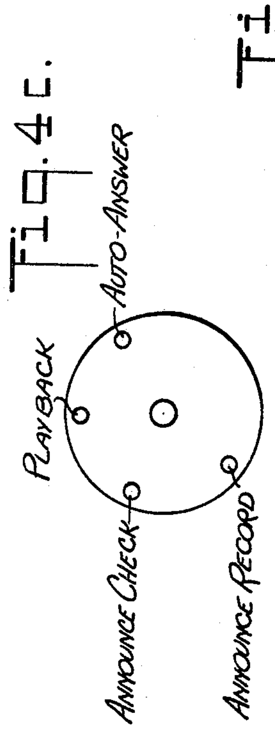
Figure 5:
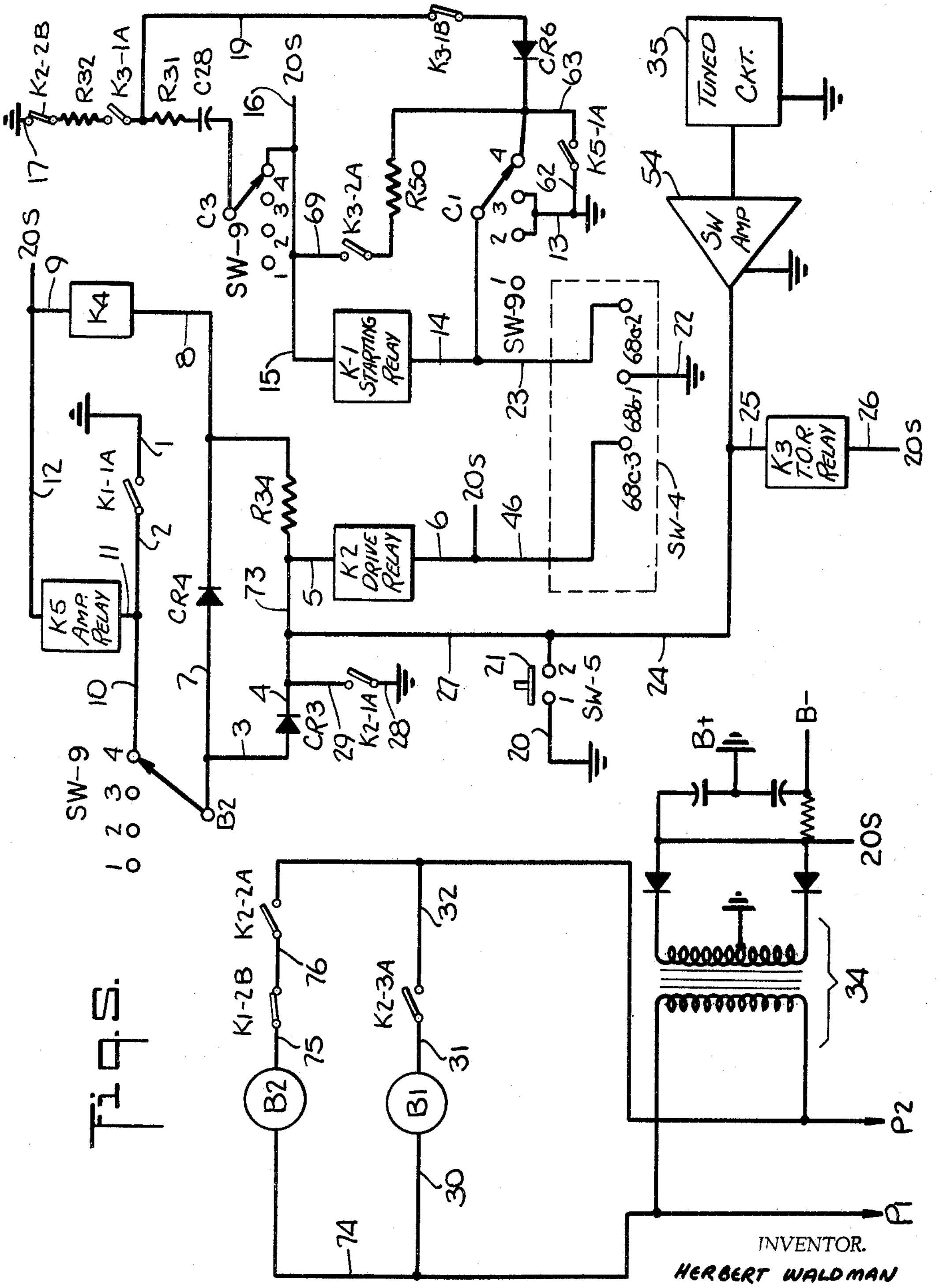
Figure 6:
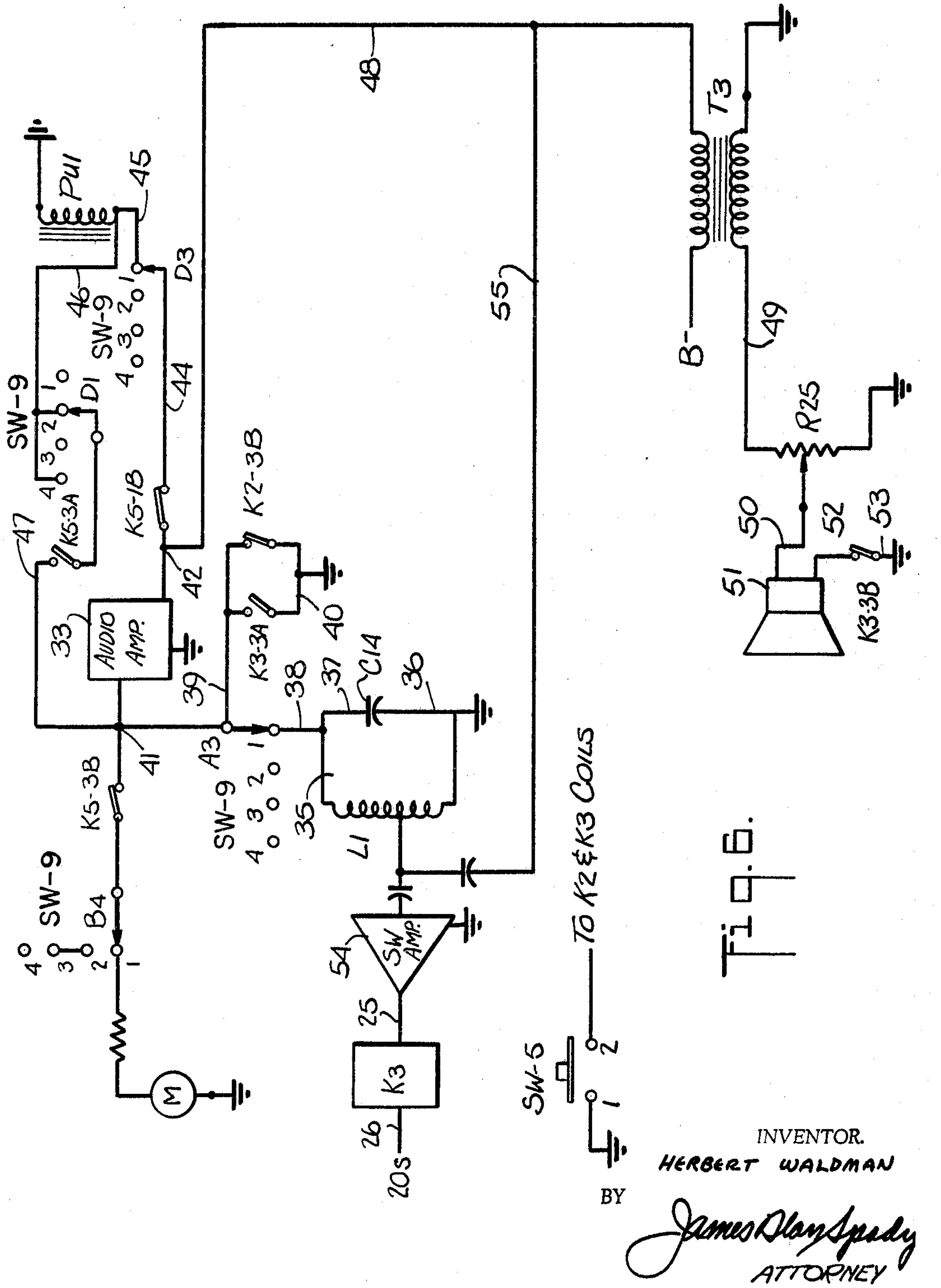
Figure 7:
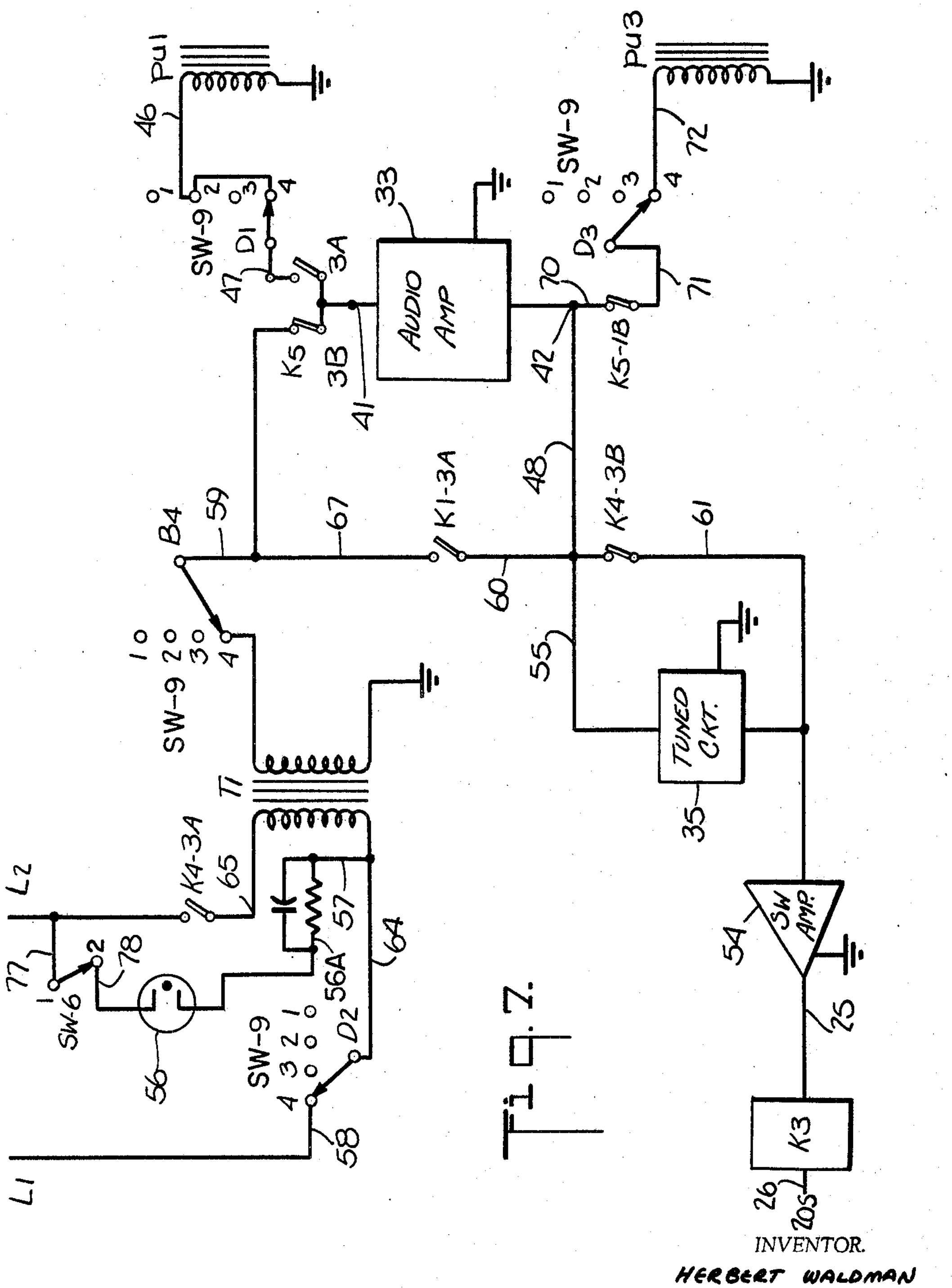

In the drawings:

FIG. 1 is a functional block diagram of the automatic answering system according to the invention, FIG. 2 is a schematic representation of the announce tape loop and its drive, FIG. 3 is a schematic representation of the message tape and its drive, FIG. 4A is a representation of the function selector switch showing its contact wafers. FIG. 4B is another representation of the function selector switch showing its 4 contacts and wiper arm C. FIG. 4C is a third representation of the function selector switch and indicates the corresponding function for each one of its four positions, FIG. 5 shows the switching relays and their various alternate power supply circuit paths, FIG. 6 shows those portions of the circuitry essential for the understanding of the operations involved in pre-recording the out-going announcement and the selective tone signal as well as in checking the play-out of same, and FIG. 7 shows those portions of the circuitry essential for the understanding of the operations involved throughout the automatic answering cycle of the apparatus.

Before describing the apparatus of the figures in detail, it should be pointed out that the telephone answering apparatus according to the invention comprises all the equipment, both mechanical and electronic that is customary in telephone answering equipment and in recording and reproducing apparatus, and that such equipment is of conventional design. Accordingly, only the components that are essential for an understanding of the invention are shown and described.

In brief, telephone answering devices may be operably associated with a telephone by one of the following methods well known in the state of the art:

(a) direct conductive connection
(b) inductive coupling
(c) acoustic coupling

The answering device of the subject invention may be visualized as being coupled to the telephone by any one of the above cited methods. The device is initiated by the ringing of the telephone facilities, and responds by answering the telephone after a predetermined number of rings, playing out a pre-recorded announcement, recording the incoming message, and finally terminating the call and readying itself for subsequent calls.

The various elements and means involved throughout the answering cycle are shown diagrammatically in FIG. 1. The "Telephone Facilities" block (FIG. 1) comprises the telephone instrument and associated telephone circuitry. The "Telephone Ringing Responsive Means" block comprises any suitable means well known in the state of the art adopted to respond to the ringing incident at the telephone facilities. This may, for example, be a contact microphone, disposed adjacent to the telephone ringer so that the ringing vibrations are mechanically transferred to the microphone. The mechanical vibrations are then converted into electrical energy and amplified by suitable amplifying means to actuate a set of starting contacts in a known manner. Another example of such means is an induction coil disposed adjacent to the telephone ringer. The starting relay may be visualized as a conventional type relay adapted upon actuation by the ringing responsive means, to initiate the cycle of operations of the answering apparatus.

To answer an incoming call, the telephone talking circuit must be completed. This can be accomplished either mechanically, e.g., by raising means which raise the handset off the base of the telephone instrument, or, electrically by closing a D.C. loop over the called line. The Telephone Answering Means used with the instant invention may be of either electrical or mechanical design, depending on the particular method employed to couple the answering device to the telephone.

The "Audio Transmission Means" block includes means for transmitting the outgoing announcement originating from the answering unit, as well as to receive the incoming message originating from the calling party. The said means may comprise acoustical, inductive or electrical devices, e.g., a loudspeaker, induction coil, electrical transformer, all well known to those skilled in the art.

The amplifier relay is a relay of conventional design adapted to switch the inputs and outputs of the amplifiers to their respective loads while the answering cycle is in progress. The "Mid-Cycle Shift Means" and the "Close-Of Cycle Shift Means" blocks, include means which transfer the answering device from the play mode into the record mode and vice versa, respectively. These means will be more fully described in connection with FIG. 7. The "Announced Drive Means" and the "Incoming Message Drive Means" will also be explained later, specifically in connection with FIGS. 2 and 3.

Referring now to FIG. 2, this figure shows a schematic representation of the Announce Drive Means. The numeral 66 designates a sound-carrier, such as magnetic tape, and it is in the form of an endless loop, fed from and returned into a cartridge 191 of conventional design.

The tape 66 is driven past a sound head PU1 by means of a capstan C1 and pressure roller P1. The capstan is driven in a conventional manner by a motor B1. The sound head PU1 should be visualized as being equipped with the appropriate circuitry necessary to record and playback intelligence onto and from tape 66. The details of this circuitry are of conventional design and not essential for the understanding of the invention, and thus are not shown in the drawings.

Three small portions 66*a*, 66*b*, and 66*c*, on the endless loop tape 66, are arranged to be electrically conductive. Any suitable and known means may be used to this end, for example, a small piece of metallic foil may be applied to said portions of tape 66. Another example would be to coat said portions with a paint of conductive silver. Conductive portions 66*a* and 66*b* extend downward from the top of the tape 66, to the center portion of the tapes width. Conductive portion 66*c* extends downward from the center portion of tape 66 to its bottom edge. All three sections 66*a*, 66*b*, and 66*c* are designed to engage with the electrical post SW–4, in the course of a cycle of the tape loop 66. The post switch SW–4 comprises three conductive sections 68*a*–2, 68*b*–1, 68*c*–3, each of which are insulated from each other. Section 68*c* is the uppermost section 68*a*–2 is the lowermost section. As can be seen in FIG. 5, sections 68*a*–2, 68*b*–1 and 68*c*–3, are connected to their respective circuits. As the conductive portions 66*a* and 66*b* pass the post SW–4, they bridge section 68*a*–2 to 68*b*–1 activating a circuit, likewise as 66*c* passes the post, it bridges section 68*c*–3 to 68*b*–1 deactuating a second circuit, all as will hereinafter be described in more detail. The announce drive means serves to record an announcement and a tone signal to be transmitted to a calling party as well as the sequencing and cycling media.

Referring now to FIG. 3, this figure shows a schematic representation of the "Incoming-Message Drive Means." The numeral 89 designates a sound-carrier, such as magnetic tape. Tape 89 travels from a supply reel 123 to a take up reel 130 and vice versa. The tape is driven past a sound head PU3 by means of a capstan C2 and pressure roller P2. The capstan is driven in a conventional manner by a motor B2. The sound head PU3 should be visualized as being equipped with the appropriate circuitry necessary to record and play-back intelligence onto and from tape 89. Since the details of this circuitry are of conventional design, and not essential to the understanding of the invention, they are not shown in the drawings to avoid prolixity. The incoming message drive means serves to record a message transmitted by a calling party and to reproduce the recorded messages to the user of the apparatus.

SWITCHING RELAYS

In order to facilitate the understanding of the various circuit sequences, the switching relays and their various alternate power supply circuit paths will be described first. Referring first to FIGURES 5, 6, and 7, each wire marked P2 is presumed to extend to a terminal of a 110 volt alternating current source. The circuit system also provides a D.C. potential of which the positive terminal is indicated by a gnd. designation. Each wire in the diagrams marked ground is presumed to extend to said positive terminal. Due to this convention, the drawing may be simplified by the omission of many unnecessary lines. Each wire in the diagrams marked 20C is presumed to extend to the negative terminal of power supply 34 in FIG. 5. The B+ and B— terminals of the power supply unit are adapted to supply proper direct voltages to the amplifiers and other sections of the circuitry as required.

It should be noted here that all relay contacts designated with the letter B are normally closed contacts and all relay contacts designated with the letter A are normally open contacts.

Referring now specifically to FIG. 5, five relay coils K1 through K5, are shown. The function of each one of these relays will be fully described in the descriptions to follow.

It will be noted that one side of each of the coils are shown to have a lead extending directly to the power supply terminal 20S. The other side of the coils are shown to extend to the ground side of the power supply via various switching paths and routes. SW–9 shown in the FIG. 5, represents a 4 position function selector switch. This switch may be of the rotary type consisting of a number of contact wafers all ganged together and rotating in unison. A diagram of this switch and the corresponding function of each position is shown in FIG. 4.

It will be observed by close inspection of FIG. 5, that once the starting relay K1 coil is energized, relay coils K2, K4 and K5 will also become energized via K1 relay contacts 1A. This can be traced in Circuits 1 through 3.

Circuit 1

Gnd. lead 1, K1 relay contacts 1A lead 2, lead 10 contact B2–4 of SW–9 wiper arm B2, lead 3, rectifier CR3, lead 4, lead 5, K2 coil, lead 6, 20S.

Circuit 2

Gnd., lead 1, K1 contacts 1A, lead 2, lead 10 contact B2–4 of SM–9 wiper arm B2, lead 7, rectifier CR–4, lead 8, K4 coil, lead 9, 20S.

Circuit 3

Gnd., lead 1, K1 contacts 1A, lead 2, lead 11, K5 coil, lead 12, 20S.

It will be further observed that relay K1-coil can be activated by one of 3 ways. This can be traced by following Circuits 4 through 6.

Circuit 4

Gnd., lead 13, SW–9 contacts C1–2 and 3, SW–9 wiper arm C1, lead 14, K1 coil, lead 15, lead 16, 20S.

Circuit 5

Gnd., lead 17, relay K2 contacts 2B, resistor R32. Relay K3 contacts 1A, resistor R31, capacitor C28, SW–9 wiper arm C3, SW–9 contact 4, lead 16, 20S.

It can be seen from Circuit 5, provided relay K3 is in actuated condition and SW–9 is in position 4, that capacitor C28 will be charged to the power supply voltage.

A discharge path is established for capacitor C28 including the coil of relay K1, thus operating relay K1. This can be traced in Circuit 5A.

Circuit 5A

Capacitor 28, resistor R31, lead 19, relay K3 contacts 1B, rectifier CR 6, SW–9 contact 4, SW–9 wiper arm C1, lead 14, K1 coil, leads 15 and 16, 20S.

Circcit 6

Gnd., lead 22, Electrical Switch Post SW–4 contact 68B–1, SW–4 contact 68*a*–2, lead 23, K1 coil, leads 15 and 16, 20S.

For purposes of simplifications, it is assumed in Circuit 6, that contacts 68B–1 and 68*a*–2 of SW–4 are electrically bridged by some means, to be more fully described at some later point in the disclosure.

Relay K3, labeled T.O.R. is a tone operated relay that is triggered into operation coincident to the play-out of the pre-recorded tone mentioned previously. The circuit description relating thereto will be set forth later on.

FIG. 5 also shows an alternate actuating path for relay K3 set forth herein below in Circuit 7.

Circuit 7

Gnd., lead 20, contact 1 of a non-latching push button switch SW–5, bridging contact 21 and contact 2 of SW–5, lead 24, lead 25, K3 coil, lead 26, 20S.

Manual operation of switch SW–5 also creates an energizing path for K2 coil. This can be traced in Circuit 8.

Circuit 8

Gnd., lead 20, SW–5 contact 1, bridging contact 21 and contact 2 of SW–5, lead 27, lead 5, K2 coil, lead 6, 20S.

The purpose and function of switch SW–5 will hereinafter be described in due course.

Relay K2 once actuated establishes its own holding path via its contacts 1A. This can be seen in Circuit 9.

Circuit 9

Gnd., lead 29, contacts 1A of K2 leads 29 and 5, K2 coil, lead 6, 20S.

PRE-RECORDING OUTGOING ANNOUNCEMENT AND TONE

As pointed out earlier, the "user" of the answering device can record his own announcement to be played out to every calling party. The circuitry of this is set forth in FIG. 6.

The Function Selector Switch SW–9 must be placed into position one in order to accomplish the stated function.

Now referring to FIG. 6, a microphone M is shown connected to the input of the Audio Amplifier 33. The "users" announcement spoken into the microphone M is amplified by amplifier 33, and recorded on to the announce tape 66 by the record play head PU1. The motor B1 for driving tape 66 is activated by the "user" operatively depressing push button switch SW–5.

Operation of SW–5 energizes relay K2 as is described in Circuit 8. Closure of K2 contacts 3A close an operating path for motor B1. This can be ascertained by referring to FIG. 5 and following Circuit 10.

Circuit 10

P1, lead 30, motor B1, lead 31, K2 contacts 3A, lead 32, P2. K2 completes a holding path for itself as set forth in Circuit 9.

Operation of SW–5 also energizes relay K3 as is described in Circuit 7.

Closure of K3 contacts 3A, complete a shorting path to gnd. for the tone oscillator tank circuit 35, (see FIG. 6) rendering it inoperative. This can be traced in Circuit 11.

Circuit 11

Gnd., lead 36, capacitor C14, lead 37, 38, SW–9 contact 4, SW–9 wiper arm A3, lead 39, K3 contacts 3A, lead 40, gnd.

The "user" continues to maintain switch SW–5 depressed throughout the delivery of his announcement. At the end of the announcement, the release of SW–5 release K3. The release of relay K3 contacts 3A ungrounds the oscillator circuit 35. The oscillator 35 now generates an audio frequency signal. This audio frequency signal is impressed on the amplifier 33 input and recorded on to the announce tape 66 by the record play head PU1. This tone may be in the frequency range of 1400 c.p.s. The recording path for both the announcement and the audio signal can be traced in Circuit 12.

Circuit 12

Amplifier 33, input 41, amplifier 33, output 32, relay K5 contacts 1B, lead 44, SW–9 wiper arm D3, SW–9 contact 1, lead 45, recording head PU1. The said 1400 c.p.s. signal is continually recorded onto the endless tape 66 throughout the course of its completing its full loop cycle. Upon having reached the near completion of its cycle, conductive portion 66*c* on the announce tape, engages the post switch SW–4, bridging sections 68*c*–3 and 68*b*–1, completing a shorting path across the relay K2 coil, releasing relay K2.

The shorting path across the coil is as follows:

Circuit 13

Gnd., lead 28, relay K2 contacts 1A, lead 29, lead 5, coil of K2, leads 6 and 46, section 68*c*–3 of SW–4, section 68*b*–1, lead 22, gnd. Drop-out of relay K2 breaks the operating path for motor B1, thus terminating the announce tape operating cycle. The "user" may now check the play-out of his recorded announcement and the recorded tone. In order to facilitate same, he must first switch the function selector switch into position 2 (check position) and then operate SW–5 momentarily. The recorded announcement will now be played out. The circuit description concerned herewith is to follow forthwith.

CHECKING OUT-GOING ANNOUNCEMENT AND TONE

In position 2 of the selector switch SW–9 relays K1 and K5 are permanently energized connecting the record play head PU1 to the amplifier 33 input, playing out the recorded announcement and subsequently the recorded tone signal through the loudspeaker.

The energizing paths for relays K1 and K5 can be noted by reviewing Circuits 4 and 3. Manual operation of switch SW–5 operates relay K2. Closure of K2 energizes motor B1 and completes a holding path for itself and as already previously described.

The audio path originating at head PU1 and terminating at the loudspeaker is traceable in Circuit 14.

Circuit 14

Record playhead PU1, lead 46, contact 2 of SW–9, SW–9 wiper arm D1, K5 contacts 3A, lead 47, Amplifier input 41, amplifier 33, amplifier output 42, lead 48, output transformer T3, lead 49, volume control R25, lead 50, speaker coil 51, lead 52, relay K3 contacts 3B, lead 53, gnd.

At the conclusion of the announcement playout, the 1400 c.p.s. signal is played-out over the loudspeaker. At the same time a portion of the said signal is impressed on the tank circuit 35 (including induction coil L1 and capacitor C14), tuned to 1400 c.p.s., serving to trigger the switching amplifier and thusly operating relay K3.

The triggering path of the tone signal is as follows.

Circuit 15

Amp. 33, output 42, lead 48, lead 55, tuned circuit 35, switching amp. 54, lead 25, relay K3 coil, lead 26, 20S.

The switching amplifier 54 is of conventional design. It should be pointed out here, that the tuned circuit 35 is designed to resonate at the tone signal frequency and may be of any suitable design well known in the state of the art. All other frequencies outside of the resonant frequency band width will be shunted to grnd. by circuit 35. It should be further pointed out at this juncture, that a continuous 1400 c.p.s. tone of about 1 second duration is required in order to trigger the switch amp. 54.

Energization of relay K3, breaks one leg of the speaker audio path, muting the loudspeaker. This can be noted by reviewing Circuit 14. The 1400 c.p.s. tone maintains K3 energized, and the consequent muting of the speaker for the duration of the tape loop 66 cycle.

The purpose in effecting the said muting of the speaker is to avoid the annoyance to the "user" of having to listen to the continuous play-out of the pre-recorded tone for the duration of the announce tape cycle, during the check announcement function.

Upon nearing the completion of the tape loop cycle, conductive portion 66C on the announce tape, engages the post switch SW–4, bridging sections 68*c*–3 and 68*b*–1, completing a shorting path across the relay K2 coil, releasing relay K2 and terminating the announce tape cycle in the same manner as already described above, in conjunction with the Record Announcement position.

AUTOMATIC ANSWERING CYCLE

In order to prepare the apparatus for the automatic answering cycle, the "user" must switch the function selector switch, SW–9, into its fourth position (automatic answering position).

To facilitate the understanding of the invention, the invention will be described in conjunction with an answering system operably associated with the telephone facilities by direct conductive connection.

In the automatic answering position, in response to an incoming call over the telephone lines L1 and L2, ringing voltage is applied to the telephone Ringing Responsive Means 56. The Ringing Responsive Means may be of any suitable type well known in the state of the art. For purposes of illustration, the ringing responsive means utilized is comprised of a neon oscillating circuit network. Such a network is the subject of, is fully described in, the copending application Ser. No. 215,625, filed Aug. 8, 1962, now abandoned, sharing a common assignee with the instant invention.

The ringing network is caused to oscillate as a result of the applied ringing voltage. Said oscillations are impressed across the telephone coupling transformer T1, amplified by amp. 33, and impressed on the switching amp. 54, biasing it to operate relay K3.

The ringing voltage path may be traced by following Circuit 16.

Circuit 16

Incoming telephone line L2, Answer Limit Switch SW–6 contacts 1 and 2, neon ring network 56 and 56A, lead 57, lead 64 SW–9 wiper arm D2, SW–9 contact D2–4, lead 58, telephone line L1.

The triggering path for K3 may be noted by following Circuit 17.

Circuit 17

T1 transformer, SW–9 contact B4–4, SW–9 wiper arm B4, lead 59, K5 contacts 3B, lead 41, amp. 33 input, amp. 33 output 42 lead 48, K4 contacts 3B lead 61, switch amp. 54, lead 25, K3 coil, lead 26, 20S.

Closure of relay K3 contacts 1A charges capacitor C28 to power supply voltage. When the ringing ends, K3 releases, completing a discharge path for C28, including the coil of K1, operating K1. This can be traced by reviewing Circuits 5 and 5A. Closure of relay K1 contacts 1A, operates relay K5. This can be traced in Circuit 3. Closure of K5 contacts 1A establishes a holding path for relay K1, as can be seen from Circuit 18 and reference to FIG. 5.

Circuit 18

Gnd., lead 62, K5 contacts 1A, lead 63, SW–9 contact 4, SW–9 wiper arm C1, lead 14, K1 coil leads 15 and 16, 20S. Relay K5 also connects the Record Playhead PU1 to the amp. 33 input as can be noted from Circuit 19.

Circuit 19

Gnd., lead PU1 winding, lead 46, SW–9 contact 4, SW–9 wiper arm D1, K5 contacts 3A, lead 47, Amp. input 41. Closure of K1 also operates relays K4 and K2. This can be traced in Circuits 2 and 1 respectively. Closure of K4 contacts 3A operates to answer the telephone call in process by closing a D.C. loop over the called line. This is accomplished as can be seen from Circuit 20, by introducing the telephone transformer T1 primary, across the incoming telephone lines L1 and L2.

Circuit 20

L1, lead 58, SW–9 contact 4, SW–9 wiper arm D2, lead 64, T1 primary, lead 65, K4 contacts 3A, L2.

The motor B1 for driving the announce tape 66 is activated by the closure of K2 contacts 3A. This can be traced in Circuit 10.

The pre-recorded announcement is now reproduced by the Announce Drive Means in conjunction with Audio Amp. 33, and transmitted to the calling party via the audio transmission means including transformer T1.

The audio path may be traced as follows:

Circuit 21

Head PU1 contact D1–4 of SW–9, wiper arm D1 of W–9, lead 47, K5 contacts 3A to amp. 33 input 41, amp. 33 output 42, lead 48, lead 60, K1 contacts 3A, leads 67 and 59, SW–9 wiper arm B4, SW–9 contact B4–4, T1 telephone coupling transformer.

*Mid-cycle shift.*—At the conclusion of the announcement play-out, the pre-recorded 1400 c.p.s. tone is played-out to the calling party. The audio path for the tone signal, is of course, the same as for the announcement.

This signal serves to indicate to the calling party that he may begin recording his messages, as well as to trigger the mid-cycle shift means, including the switch amp. 54 and relay K3, effecting the mid-cycle shift, and transferring the apparatus from the "play" mode into the "record" mode. The triggering path of the tone signal, operating K3, can be traced by reviewing Circuit 15.

Closure of relay K3 contacts 2A operates to complete a shorting path across the coil of K1, releasing K1 and thus K5. This shorting path is as follows:

Circuit 22

K1 coil, leads 15 and 69, K3 contacts 2A, resistor R50, SW–9 contact 4, SW–9 wiper arm C1, lead 14, K1 coil.

The ohmic value of the coil of K1 is approximately 1200 ohms. The ohmic value of resistor R50 is about 10 ohms.

The release of K5 and K1, operates to disconnect head PU1 and transformer I1 from the amp. 33 input and output, respectively. At the same time, K5 contacts 3B and 1B connect the transformer T1 and Record Playhead PU3 to the amp. 33 input and output, respectively. This can be traced in Circuit 23.

Circuit 23

Telephone coupling transformer T1, SW–9 contact 4, SW–9 wiper arm B4, lead 59, K5 contacts 3B, amp. input 41, amp. 33 output 42, lead 70, K5 contacts 1B, lead 71, SW–9 wiper arm D3, SW–9 contact 4, lead 72, Record Playhead PU3. Relay K2 is maintained energized by an alternate holding path including K2 contacts 1A as can be seen by reviewing circuit 9. Relay K4 is also maintained energized via contacts 1A of K2 over resistor R34. This is set forth in Circuit 24.

Circuit 24

Gnd., lead 28, K2 contacts 1A, lead 29, lead 4 and R34, lead 8, K4 coil, lead 9, 20S.

The release of K1 also completes an energizing path for motor B2, driving the message tape 89. The circuit for motor B2 is as follows:

Circuit 25

P1, lead 74, motor B2, lead 75, relay K1 contacts 2B, lead 76, K2 contacts 2A, P2.

INCOMING MESSAGE RECORDING

The incoming message drive means is now prepared to record the calling party's message onto the tape 89. The audio path may be traced by reviewing Circuit 23.

At this juncture, it should be pointed out that the tape loop 66 continuous in motion, coincident with the record mode, completing its cycle, by virtue of motor B1 being maintained in energized condition.

If the 1400 c.p.s. tone will fail to transfer the answering equipment into the record mode, as heretofore described, the tone will continue to be played-out to the calling party for the entire remaining duration of the cycle interval. The continued play-out of the said tone serves to draw the caller's attention to the fact a malfunction of the apparatus exists and will thus refrain from leaving a message.

It would also be well at this point to describe the operation of the answer limit switch, SW–6 in warding off the possibility of the apparatus accepting a call when a supply deficiency of the message recording tape develops. As pointed out earlier, the switch SW–6 is of the push button snap action type and is of standard design well known in the state of the art. SW–6 is so placed with relation to the tape supply reel 123 (FIG. 3), that its activator arm *6a*, senses the quantity of tape present on the reel 123, so that when the tape on reel 123 reaches a pre-determined low quantity, the arm *6a* assumes such an angle with relation to the switch mechanism, as to open a pair of normally closed contacts in a manner well known to those familiar with such switches.

The normally closed contacts 1 and 2 of switch SW–6, and their associated circuitry, can be followed by noting FIG. 7 in conjunction with Circuit 26.

Circuit 26

L2, lead 77, SW–6 contacts 1 and 2, lead 78, neon telephone ring sensing circuit 56 and 56A. From circuit 26, it is evident that upon the opening of contacts 1 and 2 of SW–6, the ringing sensing means will be disabled.

*Pre-closed-out warning tones.*—As pointed out earlier in connection with FIG. 2, the announce tape 66, is equipped with actuating means in the form of conductive strips adhered on to the tape surface. The utility of these actuating means is now about to be described.

When the endless tape loop 66 will have run, for example, about 90 percent of its full cycle course, the first conductive segment 66*a*, will engage with the switch post SW–4, bridging sections 68*a*–2 and 68*b*–1 and thereby energizing relay K1. Closure of K1 operates relay K5, switching the apparatus out of the "record" mode into the "play" mode. This causes the 1400 c.p.s. tone pre-recorded on the announce tape loop 66, to again be played-out over the telephone lines to the calling party. This time, the tone play-out serves to notify the calling party that there are only six seconds, for example, remaining in which he may conclude his message. The pertinent circuits herewith, may be traced by reviewing Circuits 6, 3, 19 and 21.

After approximately 1 second of tone playout the switching amplifier 54 is again triggered, with the consequent actuation of relay K3, completing a shorting path across the coil of K1, releasing K1 and thus K5, all as has already been described with respect to the mid-cycle-shift function.

The release relays K1 and K5 operate to shift the apparatus back into the "record" mode, terminating the play-out of the 1400 c.p.s. tone. As a result of the cessation of tone play-out, relay K3 drops out, and segment 66*a* again causes the pull-in of relays K1 and K5, and the play-out of the tone repeats again. Once more, following the continued play-out for approximately 1 second, of the said tone, relay K3 is again actuated and relays K1 and K5 again drop out. Again the tone ceases.

It will be clear from the above description that an oscillatory action consisting of a series of intervals of play-out and non-play-out of tones in succession is set up. The total duration of this series of spaced tones is determined by the length or duration of the conductive strip 66*a* on the tape loop 66.

*Close-out tone.*—After the final play-out of the pre-close-out tone interval, the apparatus continues in the "record" mode for approximately 6 seconds (as per our example) after which a second conductive strip 66*b* bridges the switch post SW–4 contacts 68*a*–2 and 68*b*–1, effecting the play-out of a third series of 1400 c.p.s. tones affecting the close-of-cycle shift, transferring the apparatus from the "record" mode back into the "play" mode. The circuitry and method of operation relating hereto is the same as described for the pre-close-out tones.

The close-out tone serves to notify the calling party that the close-out of the apparatus cycle is approaching, so that he may record a concluding statement (such as where to call him) following the play-out of the said close-out tones.

*Close-of-cycle.*—Upon completion of the announce tape loop 66 cycle, the third conductive strip 66*c*, engages the post switch SW–4, bridging sections 68*b* and 68*c*, completing a shorting path across the coil of relay K2, releasing K2. This shorting path can be traced by reviewing Circuit 13.

Drop out of relay K2, breaks the operating paths for motors B1, B2 and relay K4, thus terminating the cycle of operations and returning the apparatus into a standby condition, in readiness to answer subsequent calls.

From all the above description, it is clear that the announce tape loop serves not only as the sound carrier for the outgoing announcement but acts also in the capacity of a signalling media as well as in the capacity of the sequencing and cycling media. It also becomes evident from the above description that if the total cycle time of tape loop 66 is, for example, sixty seconds, then the total interval of operation of the apparatus from the Announce-Out phase to the Close-of-Cycle phase will be sixty seconds. Furthermore, it is also self-evident, that the "user" can readily control the time duration of the Incoming Message Recording phase, by varying the time duration of his pre-recorded announcement (whether filled with his voice record or including "wasted" silent time interspersed deliberately). The less time the "user" consumes for his announcement, the more time is allowed for a calling party to record his message, and vice versa.

What is claimed as new and desired to be secured by Letters Patent is:

1. In a telephone answering and recording apparatus for association with a telephone receiver embodying cueing and warning tones having instrumentalities and the necessary circuit connections thereto including a power circuit and an amplifier for performing an automatic telephone answering function, a play-out function, a recording function; said instrumentalities and circuit connections for performing said play-out function including a movable sound carrier in the form of an endless tape loop containing actuating means and having recorded thereon a tone of a pre-selected frequency substantially for the entire balance of said loop cycle succeeding an announcement pre-recorded on said loop, said loop being mobile during said play-out function and continuing in motion during said recording function, sensing means coating with said actuating means, switching means controlled by said sensing means upon said loop reaching a pre-determined cycling position incident to said record function, shifting the apparatus out of said record function into said play-out function and effecting the play-out of the said tone serving to indicate that said recording function interval has been terminated.

2. In a telephone answering and recording apparatus for association with a telephone receiver employing cueing and warning tones having instrumentalities and the necessary circuit connections thereto including a power circuit and an amplifier for performing an automatic telephone answering function, a play-out function, a recording function; said instrumentalities and circuit connections for performing said play-out function including a movable sound carrier in the form of an endless tape loop containing actuating means and having recorded thereon a tone of a pre-selected frequency substantially for the entire balance of said loop cycle succeeding an announcement prerecorded on said loop, said loop being mobile during said play-out function, first switching means in response to the play-out of said tone shifting the apparatus out of said play-out function into said record function and said loop continuing in motion during said record function, first sensing means coacting with said actuating means, second switching means controlled by said first sensing means upon said loop reaching a predetermined cycling position incident to said record fuction shifting the apparatus out of said record function into said play-out function and effecting the play-out of said tone serving to indicate that the close of said recording function is about to occur, said first switching means in response to said tone, again shifting the apparatus out of said play-out function back into said record function.

3. In a telephone answering and recording apparatus for association with a telephone receiver embodying cueing and warning tones having instrumentalities and the necessary circuit connections thereto including a power circuit and an amplifier for performing an automatic telephone answering function, a play-out function, a recording function; said instrumentalities and circuit connections for performing said play-out function including a movable sound carrier in the form of an endless tape loop containing first, and second actuating means and having recorded thereon a tone of a pre-selected frequency substantially for the entire balance of said loop cycle succeeding an announcement pre-recorded on said loop, said loop being mobile during said play-out function, first switching means in response to the play-out of said tone shifting the apparatus out of said play-out function into said record function and said loop continuing in motion during said record function, first sensing means coacting with said first and second actuating means, second switching means controlled by said first sensing means upon said loop reaching a predetermined cycling position incident to said record function shifting the apparatus out of said record function into said play-out function and effecting the play-out of said tone serving to indicate that but a few more seconds remain for the recording function interval, said first switching means in response to said tone, again shifting the apparatus out of said play-out function back into said record function, said second actuating means upon said loop reaching another predetermined cycling position coacting with said first sensing means to control said second switching means to again shift the apparatus out of said record function into said play-out function once more effecting the play-out of said tone serving to indicate that the close of the recording function is about to occur, said first switching means in response to said tone, once more shifting the apparatus out of said play-out function back into said record function.

4. In a telephone answering and recording apparatus for association with a telephone receiver embodying cueing and warning tones having instrumentalities and the necessary circuit connections thereto including a power circuit and an amplifier for performing an automatic telephone answering function, a play-out function, said instrumentalities and circuit connections for performing said play-out function including a movable sound carrier containing actuating means and having recorded thereon a tone of a pre-selected frequency succeeding an announcement message pre-recorded on said sound carrier, drive means for driving said sound carrier, a tuned circuit responsive to play-out of said tone for a predetermined time constant and first switch means responsive to said tuned circuit output, said actuating means comprising a conductive layer on a portion of said sound carrier, sensing means comprised of switch contacts engageable with said conductive layer for the bridging of the switch contacts by said layer upon said portion of said sound carrier being driven past said switch contacts, the length of said layer being such that it would take more than twice the time of said time constant for said layer to be driven past said switch contacts, second switching means controlled by said sensing means upon coaction with said actuating means conditioning the apparatus into said play-out function and effecting the play-out of said tone, said first switching means in response to said tone play-out for the duration of said time constant terminating said play-out function thus, arresting the play-out of said tone, said sensing means in coaction with said actuating means against controlling said second switching means to condition the apparatus into said play-out function and again effecting the play-out of said tone, said first switching means again terminating said play-out function and arresting the play-out of said tone upon its play-out for the duration of said time constant.

References Cited

UNITED STATES PATENTS

| | | | |
|---|---|---|---|
| 2,793,252 | 5/1957 | Augustadt et al. | 179—6 |
| 2,799,726 | 7/1957 | Van Deventer et al. | 179—6 |
| 2,848,541 | 8/1958 | Zimmermann | 179—6 |
| 2,928,893 | 3/1960 | Salzberb et al. | 179—6 |
| 3,310,629 | 3/1967 | Yamamoto et al. | 179—6 |
| 2,815,401 | 12/1957 | O'Dwyer | 179—6 |

BERNARD KONICK, Primary Examiner

R. F. CARDILLO, JR., Assistant Examiner